(12) United States Patent
Chang et al.

(10) Patent No.: US 9,819,100 B1
(45) Date of Patent: Nov. 14, 2017

(54) INSULATING APPARATUS FOR METALLIC BUSBAR

(71) Applicants: LITE-ON ELECTRONICS (GUANGZHOU) LIMITED, Guangzhou (CN); LITE-ON TECHNOLOGY CORPORATION, Taipei (TW)

(72) Inventors: Hsiao-Yu Chang, Taoyuan (TW); Sheng-Chan Tu, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/393,901

(22) Filed: Dec. 29, 2016

(30) Foreign Application Priority Data

Sep. 26, 2016 (CN) .......................... 2016 1 0851353

(51) Int. Cl.
*H01R 4/60* (2006.01)
*H01R 4/70* (2006.01)

(52) U.S. Cl.
CPC ...................... *H01R 4/70* (2013.01)

(58) Field of Classification Search
CPC ............ H01R 4/70; H01R 4/72; H01R 4/726
USPC .................. 439/212, 213, 625; 174/88 B
See application file for complete search history.

(56) References Cited

U.S. PATENT DOCUMENTS

| | | | | |
|---|---|---|---|---|
| 9,190,791 B1* | 11/2015 | Jaena | .................. | H01R 25/162 |
| 9,520,703 B2* | 12/2016 | Jaena | ....................... | H02G 5/08 |
| 2013/0171849 A1* | 7/2013 | Mooney | .................. | H01R 4/60 |
| | | | | 439/213 |
| 2013/0171850 A1* | 7/2013 | Mooney | ................. | H02G 5/007 |
| | | | | 439/213 |

* cited by examiner

*Primary Examiner* — Khiem Nguyen
(74) *Attorney, Agent, or Firm* — Li & Cai Intellectual Property (USA) Office

(57) ABSTRACT

An insulating apparatus for a metallic busbar is disposed on an interconnection part of a first strip and a second strip of the metallic busbar. The insulating apparatus includes a first insulated member, a second insulated member and a securing member. The first insulated member is formed with at least one slot. The second insulated member overlaps the first insulated member. The securing member passes through the second insulated member and the slot of the first insulated member to be slidably disposed in the slot, so that the first insulated member and the second insulated member are movable in a telescopic manner. The first insulated member and the second insulated member can cover the interconnection part of the first and second strips. The insulating problem of the interconnection part of a metallic busbar is solved, shortening the manufacturing period and manufacturing conveniently with lower cost.

9 Claims, 7 Drawing Sheets

INSULATING APPARATUS FOR METALLIC BUSBAR

BACKGROUND OF THE INVENTION

1. Field of the Invention

The invention relates to an insulating apparatus, more particularly to an insulating apparatus which is applied to a metallic busbar.

2. Description of Related Art

In electrical power distribution, a power supply has an interconnection part, connecting one metallic strip and another metallic strip, which cannot be insulated directly since it is operated to conduct electric current. However, accidents may happen if the interconnection part of the metallic strip and the other metallic strip is not externally insulated with suitable protection. The available insulating way for the interconnection part of two metallic strips, for example, is to utilize an electric varnish. However, the mentioned insulating way may increase additional costs of manufacturing. Another insulating way may use a plastic cover or a heat shrink tube to cover the interconnection part of two metallic strips, but the length of the plastic cover or the heat shrink tube is fixed with less length adjustments.

Therefore, the present inventor believes the above mentioned disadvantages can be overcome to propose the present disclosure with reasonable designs and improvements.

SUMMARY OF THE INVENTION

The instant disclosure provides an insulating apparatus for a metallic busbar, which can solve the problem that an interconnection part of metallic busbar cannot be insulated externally, and is telescoped to adjust length, so as to shorten periods of manufacturing and to increase the convenience of the manufacture with less cost.

In order to achieve the above objectives, the instant disclosure provides an insulating apparatus for a metallic busbar. The insulating apparatus is disposed on an interconnection part of a first metallic strip and a second metallic strip of the metallic busbar. The insulating apparatus includes a first insulated member, a second insulated member and at least one securing member. The first insulated member is formed with at least one slot. The second insulated member is connected to the first insulated member in an overlapping manner. The at least one securing member passes through the second insulated member and the at least one slot of the first insulated member to be slidably disposed in the at least one slot. Therefore, the first insulated member and the second insulated member are movable in a telescopic manner. The first insulated member and the second insulated member are capable of covering the interconnection part of the first metallic strip and the second metallic strip of the metallic busbar.

Preferably, a blocking structure is formed at the at least one slot. The at least one securing member is abutted against the blocking structure and is positioned fixedly.

Preferably, the blocking structure has a blocking tab. The blocking tab is protruded toward the slot. The blocking tab has a guiding edge and a stopping edge. The guiding edge is oblique. The at least one securing member is slidable along the guiding edge and is abutted against the stopping edge so as to be located fixedly.

The beneficial effects of the instant disclosure are as follows.

The instant disclosure utilizes the securing member to secure the first insulated member and the second insulated member, and the first insulated member is formed with a slot. The securing member is slidably disposed in the slot, so that the length between the first insulated member and the second insulated member can be adjusted in a telescopic manner. A user can operate it easily to complete the insulating process. Compared with the conventional ways, the instant disclosure can shorten periods of manufacturing and increase the convenience of the manufacture with less cost.

After a metallic busbar is installed, the insulating apparatus of the instant disclosure can be stretched to cover the interconnection part of the metallic busbar, so as to solve the problem that the interconnection part of the metallic busbar may not be easily insulated.

The instant disclosure further provides the blocking structure formed at the slot, and the securing member can be positioned fixedly by abutting against the blocking structure. The insulating apparatus thus can be stretched easily, and does not contract unexpectedly because of vibration or external force. A force needs to be exerted deliberately for contracting.

The first insulated member and the second insulated member of the instant disclosure is overlapped in a telescopic manner, so that it can be easily assembled and is not limited by a confined operation space.

In order to further understand the features and technical content of the instant disclosure, reference is made to the following detailed description and accompanying drawings of the instant disclosure. However, the accompanying drawings are only intended for reference and illustration, but do not limit the instant disclosure.

BRIEF DESCRIPTION OF THE DRAWINGS

FIG. 3A is a schematic view of "A" portion in FIG. 3 of the instant disclosure;

DETAILED DESCRIPTION OF THE PREFERRED EMBODIMENTS

The instant disclosure provides an insulating apparatus for a metallic busbar. The metallic busbar can be applied to different fields and is not limited thereto, for example, it can be applied to an output metallic busbar bridging a power supply and a power distribution cabinet.

Figure 5:
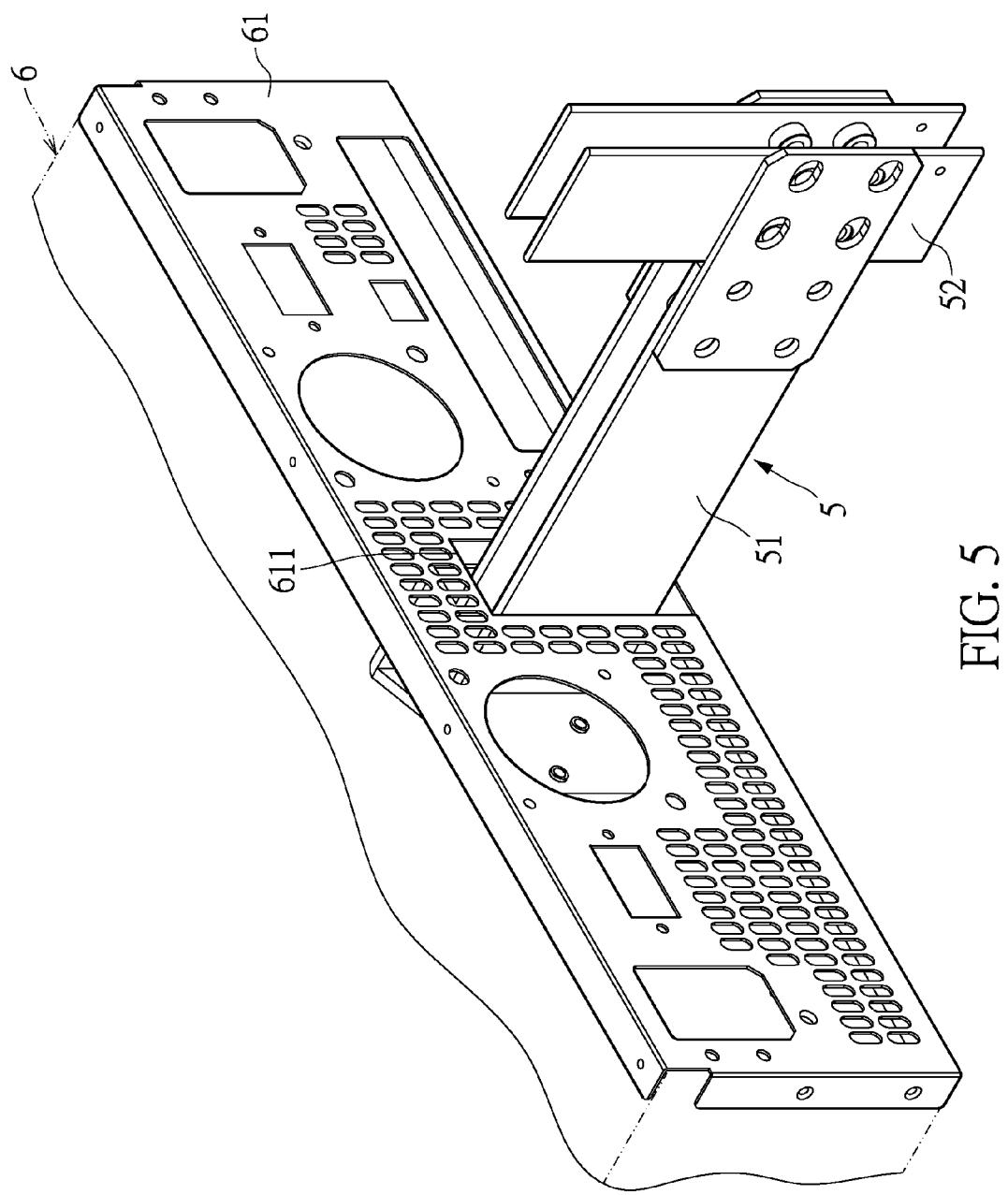
FIG. 5 is a perspective view of the insulating apparatus with a metallic busbar of the instant disclosure.
Figure 6:
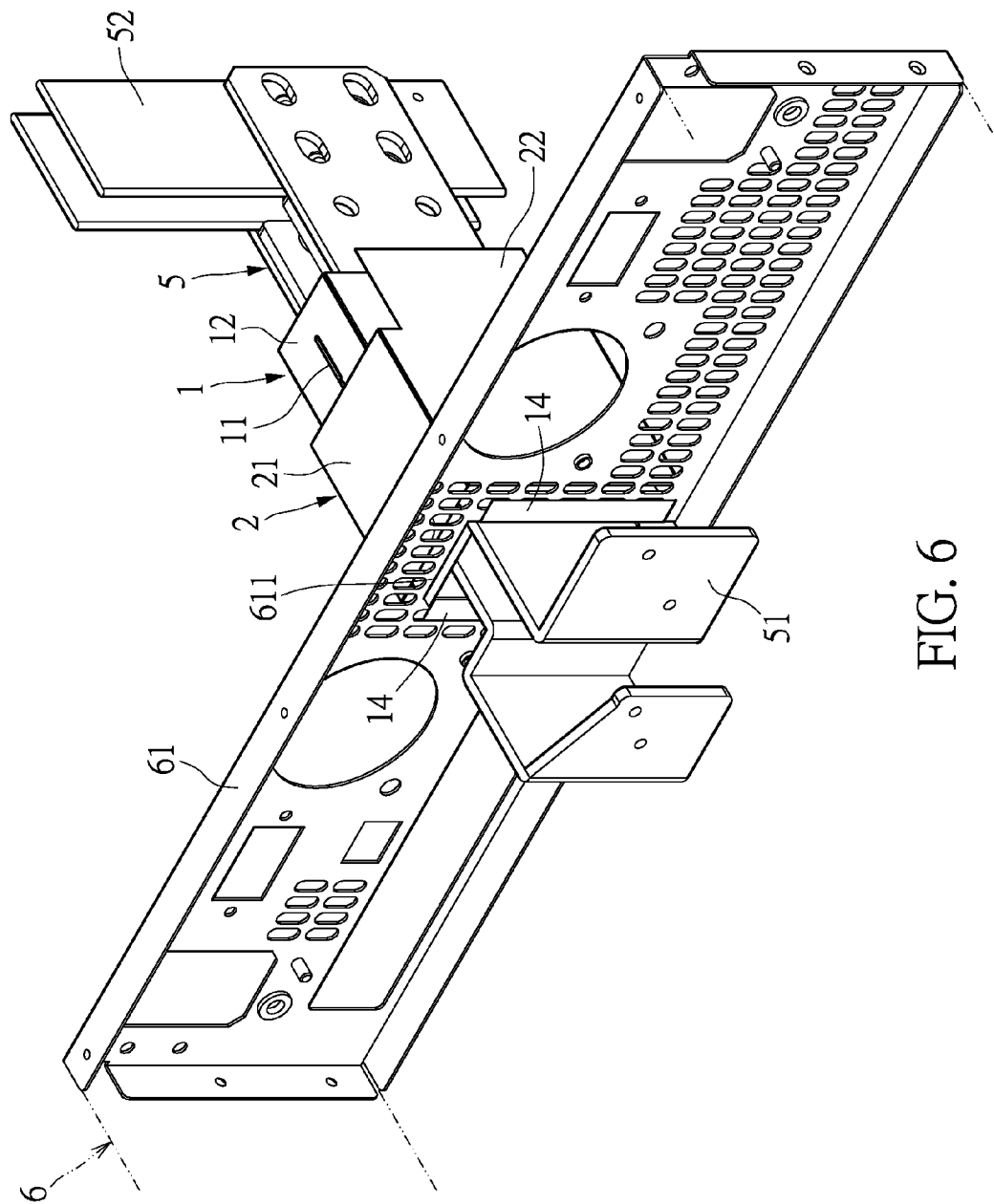
FIG. 6 is another perspective view of the insulating apparatus with the metallic busbar of the instant disclosure.

Refer to FIG. 5 and FIG. 6. The insulating apparatus is disposed on an interconnection part of a first metallic strip 51 and a second metallic strip 52 of a metallic busbar 5. As shown in FIG. 1 to FIG. 4, the insulating apparatus includes a first insulated member 1, a second insulated member 2 and at least one securing member 3.

The first insulated member 1 and the second insulated member 2 are made of insulating sheet material. For example, the material specification can be PC175A or EFR9912R . . . etc. The thickness of the insulating sheet material preferably is 0.43 mm, but the material type and thickness of the insulating sheet material of the first insulated member 1 and the second insulated member 2 are not limited thereto.

The first insulated member 1 can be a hollow housing. In this embodiment, the first insulated member 1 is a square-shaped hollow housing. The first insulated member 1 is formed with at least one slot 11. The slot 11 is extended along a longitudinal direction of the first insulated member 1. In detail, the first insulated member 1 has four first side walls 12, and the first side walls 12 are connected to form a square-shaped hollow housing, but the structure of the first insulated member 1 is not limited thereto. For example, the first insulated member 1 can be a hollow cylinder, or a U-shaped hollow housing composed of three first side walls 12. In this embodiment, the slot 11 is formed on two opposite sides of the first insulated member 1. That is, each of two first side walls 12, which are opposite to each other, of the first insulated member 1, has one slot 11.

The second insulated member 2 is connected to the first insulated member 1 in an overlapping manner. The second insulated member 2 can be a hollow housing. In this embodiment, the second insulated member 2 and the first insulated member 1 are corresponded square-shaped hollow housings, so that the first insulated member 1 and the second insulated member 2 are able to sleeve each other, i.e. the second insulated member 2 is able to sleeve around the four first side walls 12 of the first insulated member 1. In addition, the first insulated member 1 and the second insulated member 2 are telescopic, i.e. the first insulated member 1 and the second insulated member 2 are movable to each other in a telescopic manner, to have an adjustable length between the first insulated member 1 and the second insulated member 2 according to different requirements. In detail, the second insulated member 2 has four second side walls 21, and the second side walls 21 are connected to form another square-shaped hollow housing, but the structure of the second insulated member 2 is not limited thereto. For example, the second insulated member 2 can be a hollow cylinder, or a U-shaped hollow housing composed of three second side walls 21.

The securing member 3 passes through the second insulated member 2 and the slots 11 of the first insulated member 1, so that the first insulated member 1 and the second insulated member 2 can be integrated together by the securing member 3. The securing member 3 is slidably disposed through the slot 11, so that the first insulated member 1 and the second insulated member 2 are easily telescoped. The first insulated member 1 and the second insulated member 2 are assembled as the insulating apparatus to cover the interconnection part of the first metallic strip 51 of the metallic busbar 5 and the second metallic strip 52.

The number of the securing member 3 can be at least two, and the at least two securing members 3 are respectively passed through two opposite sides of the second insulated member 2 and the slots 11 on two opposite sides of the first insulated member 1. In this embodiment, there are four securing members 3, and the four securing members 3 are divided into two pairs to respectively pass through two opposite sides of the second insulated member 2 and the slots 11 on two opposite sides of the first insulated member 1. Each of two opposite sides of the second insulated member 2 has two securing members 3, which also passes through the slot 11 on each of two opposite sides of the first insulated member 1. Thus, there are total four securing members 3 to stably connect the first insulated member 1 with the second insulated member 2, and the telescopic movement of the first insulated member 1 and the second insulated member 2 is more stable.

Figure 1:
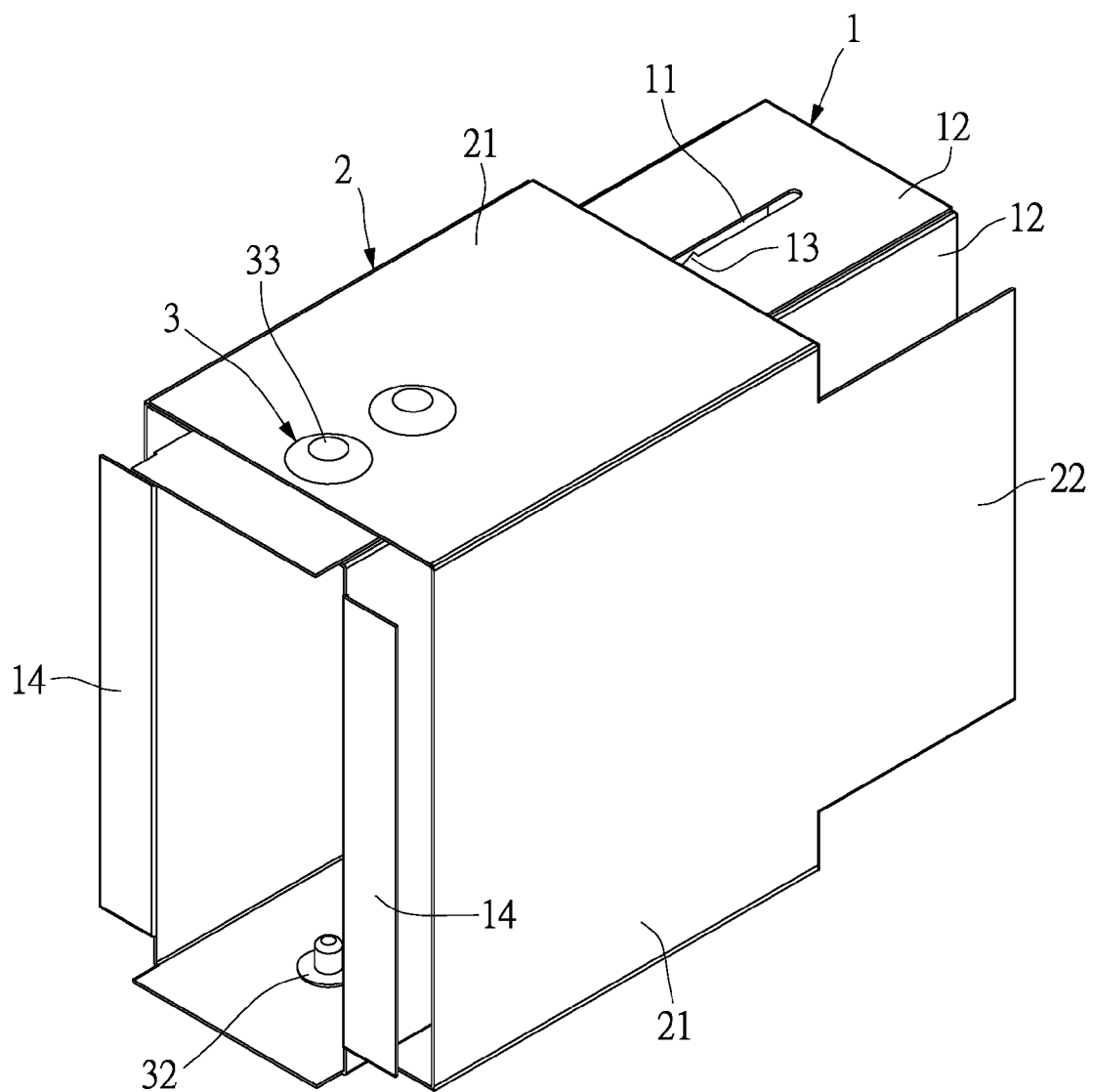
FIG. 1 is an assembled perspective view of an insulating apparatus of the instant disclosure.
Figure 2:
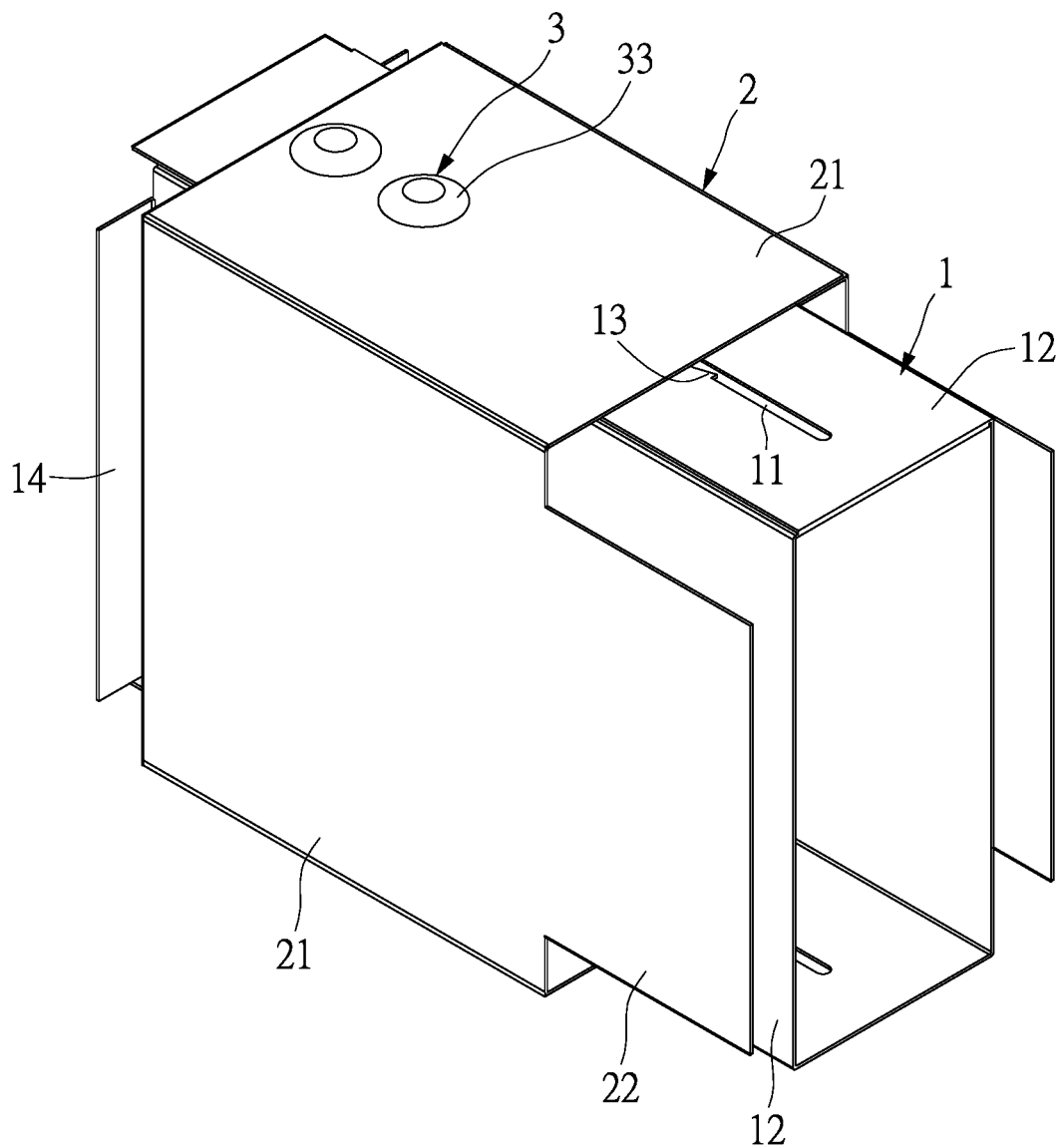
FIG. 2 is another assembled perspective view of the insulating apparatus of the instant disclosure.
Figure 3:
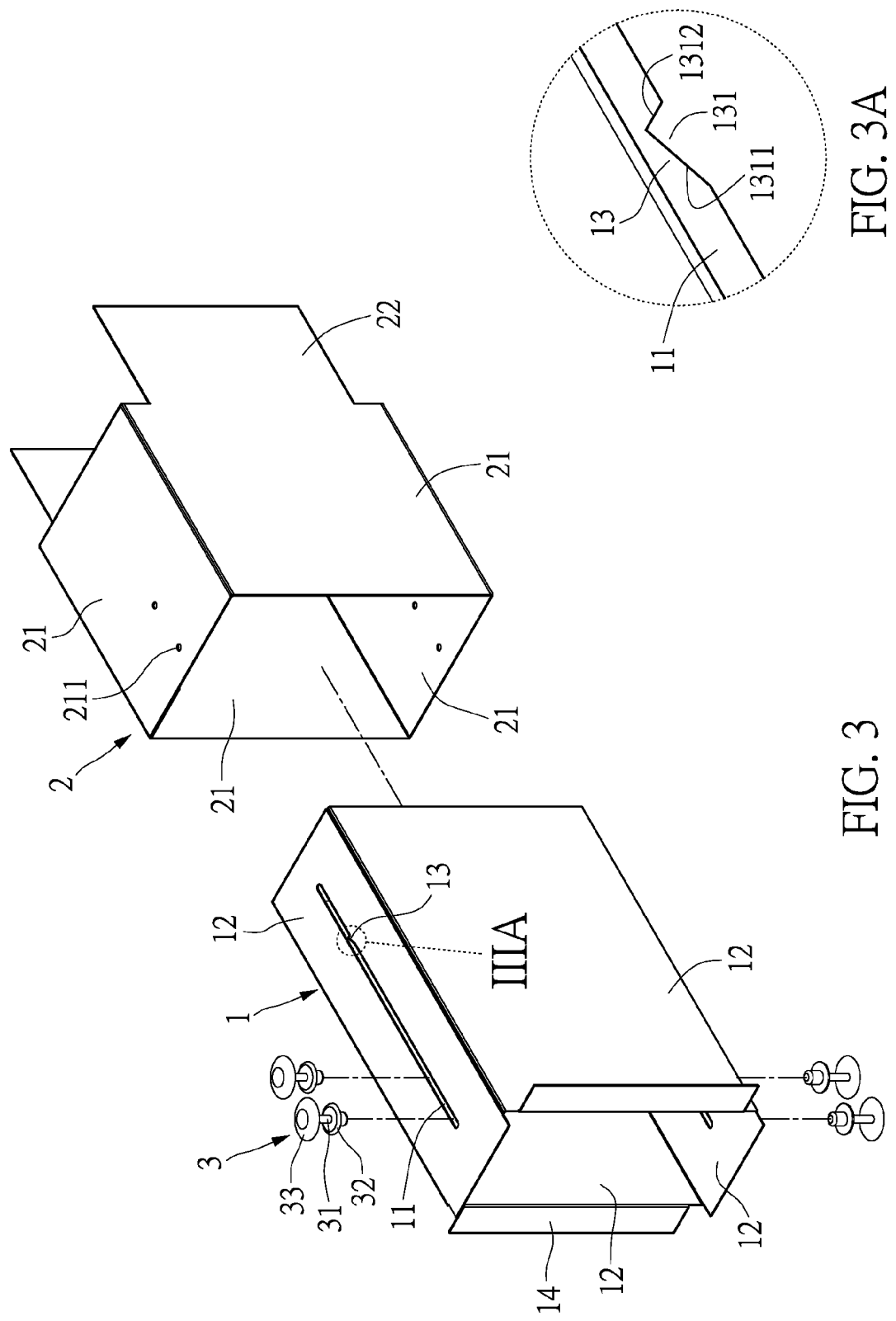
FIG. 3 is an exploded perspective view of the insulating apparatus of the instant disclosure.
Figure 4:
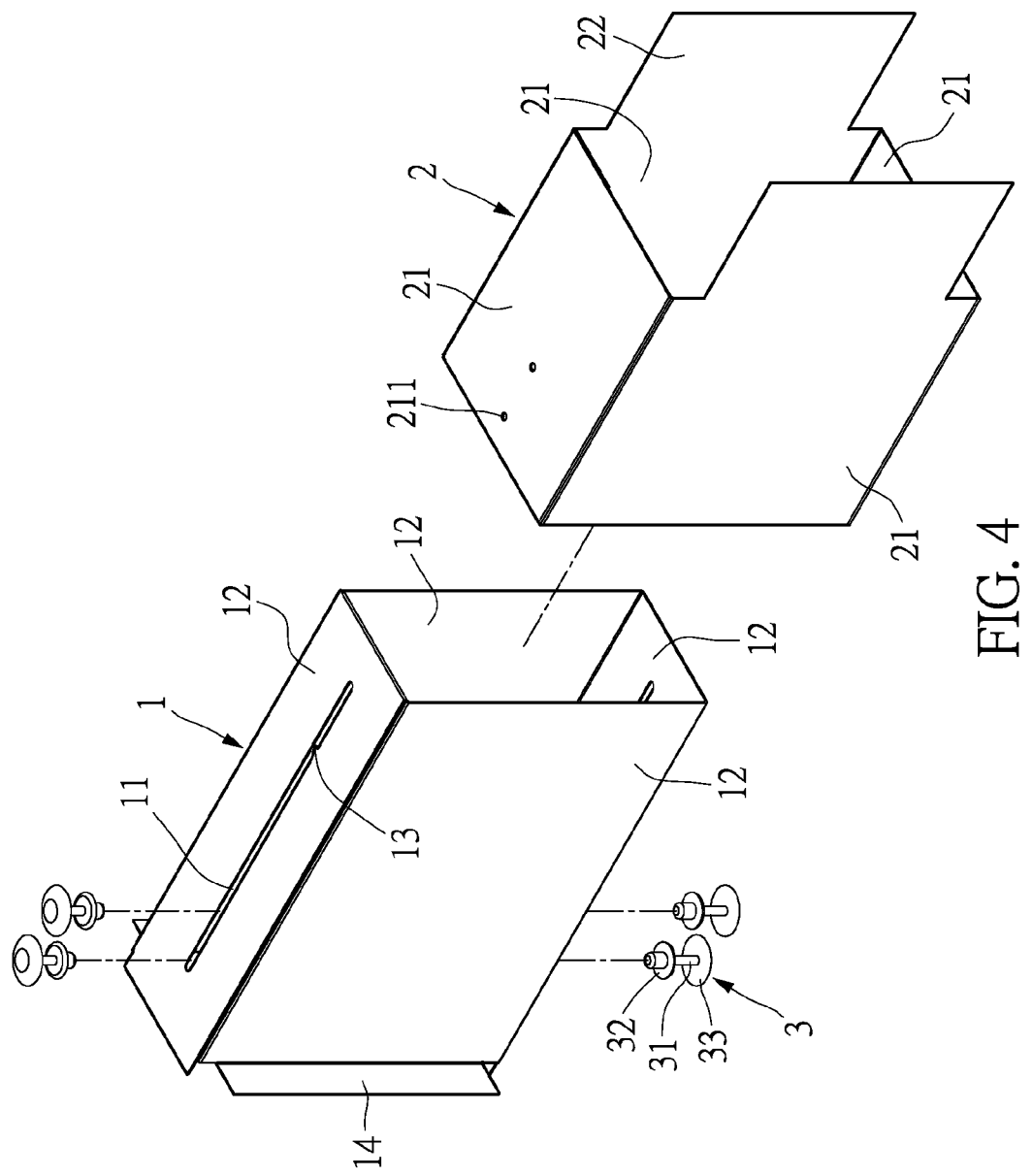
FIG. 4 is another exploded perspective view of the insulating apparatus of the instant disclosure.

In this embodiment, the securing member 3 is a rivet, such as a nylon rivet. The securing member 3 has a rod 31, a first head 32 and a second head 33. The first head 32 is connected to one end of the rod 31, and the second head 33 is connected to the other end of the rod 31. The outer diameter of the first head 32 or the outer diameter of the second head 33 is larger than an outer diameter of the rod 31. As shown in FIG. 3, the rod 31 passes through the second insulated member 2. The second insulated member 2 has two opposite sides, which are formed with a fixing hole 211 respectively. The rod 31 passes through the fixing hole 211 and the slot 11 of the first insulated member 1. The rod 31 is slidably disposed through the slot 11, so that the rod 31 can move between two ends of the slot 11. The first head 32 and the second head 33 are respectively closed to or abutted against two opposite sides of the first insulated member 1 and the second insulated member 2. In this embodiment, the first insulated member 1 has two opposite first side walls 12 which are narrower than the others, and the second insulated member 2 has two opposite second side wall 21 which are narrower than the others. The slots 11 are formed on the two narrower first side walls 12, and the fixing holes 211 are formed on the two narrower second side wall 22. In another embodiment, the slots 11 and the fixing holes 211 can also be formed on two wider side walls of the first insulated member 1 and the second insulated member 2.

In addition, a blocking structure 13 is disposed at each slot 11. The blocking structure 13 is protruded toward the slot 11, so that the securing member 3 can be abutted against the blocking structure 13. The blocking structure 13 has a blocking tab 131 and a stopping edge 1312 as shown in FIG. 3A. The blocking tab 131 is protruded at the slot 11, and the blocking tab 131 can be a triangle plate. The blocking tab 131 has a guiding edge 1311, and the guiding edge 1311 is slanted to provide a function of guiding the rod 31. The securing member 3 can cross the guiding edge 1311, and is abutted against the stopping edge 1312 of the blocking tab 131. When the securing member 3 needs to slide or move along the slot 11, an external force applied to the securing member 3 is required to release the securing member 3 from the blocking structure 13. The blocking structure 13 is not limited to form the structure shown in FIG. 3A, and, for example, the blocking tab 131 can be a curved plate or other shape.

Figure 7:
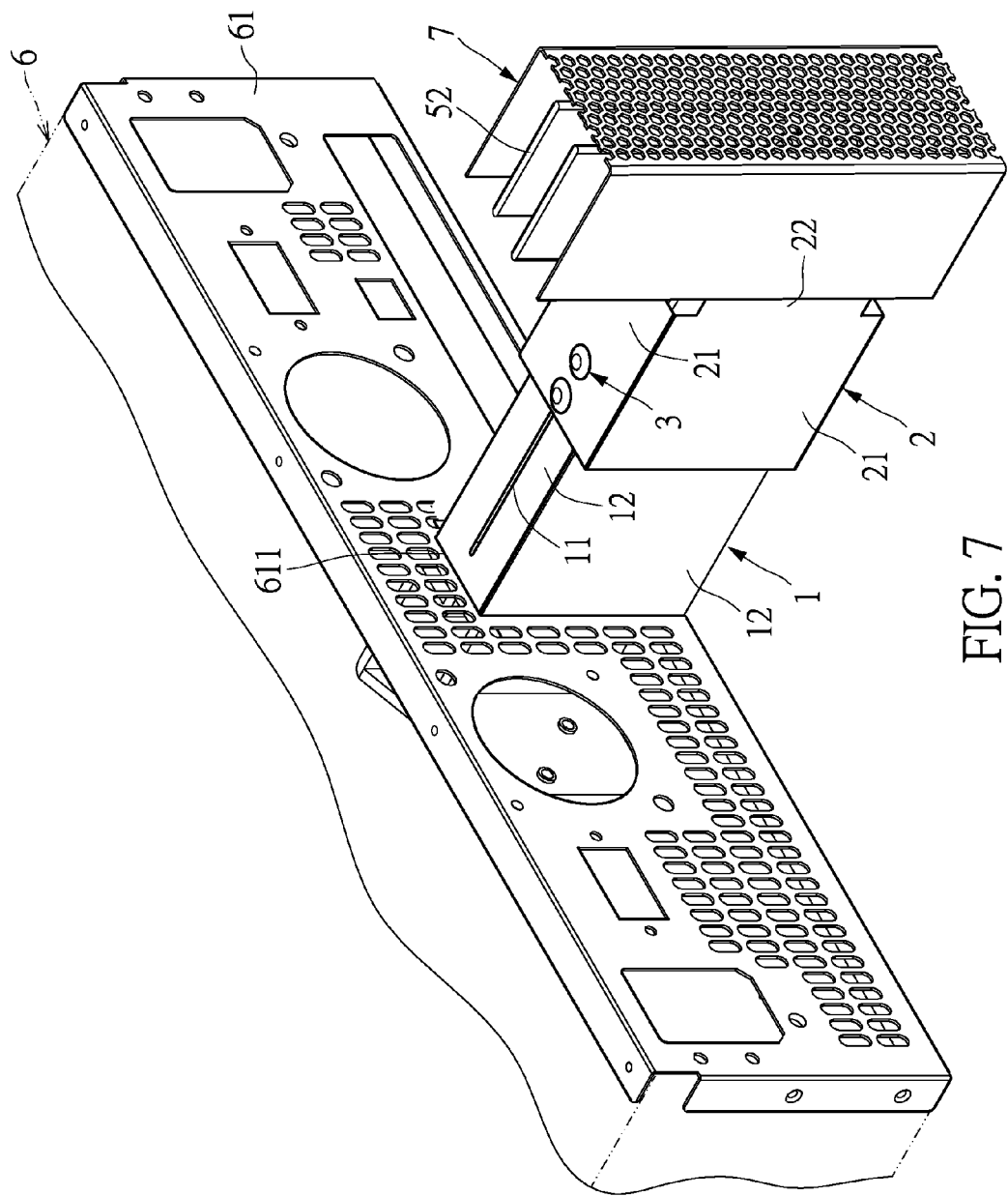
FIG. 7 is another perspective view of the insulating apparatus with the metallic busbar of the instant disclosure.

In this embodiment, the first metallic strip 51 is a metallic busbar of a power device 6. The power device 6 can be a power supply. The power device 6 has a back board 61. The first metallic strip 51 passes through an opening 611 of the back board 61, as shown in FIG. 5. The second metallic strip 52 is a metallic busbar of a power manager cabinet. The first insulated member 1 has one end, which can be called a first end, which further has at least one retaining board 14. The retaining board 14 is protruded outwardly from an outer edge of the first insulated member 1. In this embodiment, there are two retaining boards 14 to be arranged at two opposite sides of the first end of the first insulated member 1. The first end of the first insulated member 1 can be inserted in the opening 611 of the back board 61, as shown in FIG. 7. The two retaining boards 14 can be abutted against an inner edge of the back board 61, as shown FIG. 6. Thus, the first end of the first insulated member 1 can be fixedly wedged to the back board 61 of the power device 6.

In addition, one end of the second insulated member 2 has at least one protrusion board 22. In this embodiment, there are two protrusion boards 22 to be formed at two opposite sides of one end of the second insulated member 2. The protrusion boards 22 can cover an outer edge of the second metallic strip 52. As shown in FIG. 7, a shield housing 7 is provided to cover a periphery of the second metallic strip 52. Two protrusion boards 22 can be sandwiched between the shield housing 7 and the second metallic strip 52.

The instant disclosure utilizes the securing member to secure the first insulated member and the second insulated member, and the first insulated member is formed with a slot. The securing member is slidably disposed through the slot, so that the length between the first insulated member and the second insulated member can be adjusted in a telescopic manner. A user can operate it easily to complete the insulating process. Compared with conventional ways, such as a heat shrink tube, electric varnish or a plastic cover . . . etc., the instant disclosure can shorten periods of manufacturing and increase the convenience of the manufacture with less cost.

The insulating apparatus of the instant disclosure can be easily stretched to cover the interconnection part of the metallic busbar after the metallic busbar is installed, so as to solve the problem that the interconnection part of metallic busbar is hard to be insulated. The first insulated member and the second insulated member of the instant disclosure are overlapped in a telescopic manner, so that it can be easily assembled and is not limited by a confined operation space.

The instant disclosure further has the blocking structure arranged at the slot, and the securing member can be located fixedly by abutting against the blocking structure. The insulating apparatus thus can be stretched easily, and is not contracted unexpectedly because of vibration or external force. It needs to have a force exerted deliberately for contracting.

The description above is only preferred embodiments of the instant disclosure and is not intended to limit the scope of the instant disclosure. All equivalent technical changes made according to the specification and drawings of the instant disclosure should fall within the scope of the instant disclosure.

What is claimed is:

1. An insulating apparatus for a metallic busbar, disposed on an interconnection part of a first metallic strip and a second metallic strip of the metallic busbar, the insulating apparatus comprising:
   a first insulated member, having a side wall and a blocking tab, wherein the side wall is formed with at least one slot, and the blocking tab is positioned on the side wall and protrudes toward the slot;
   a second insulated member, connected to the first insulated member in an overlapping manner; and
   at least one securing member, passing through the second insulated member and the at least one slot of the first insulated member to be slidably disposed in the at least one slot; wherein the first insulated member and the second insulated member are movable in a telescopic manner; thereby the first insulated member and the second insulated member are capable of covering the interconnection part of the first metallic strip and the second metallic strip of the metallic busbar;
   wherein the blocking tab has a guiding edge and a stopping edge, the at least one securing member is capable of crossing the guiding edge by exerting a force on the second insulated member, and is abutted against the stopping edge so as to be positioned fixedly.

2. The insulating apparatus for a metallic busbar according to claim 1, wherein the first insulated member and the second insulated member are hollow housings, the first insulated member and the second insulated member are sleeved to each other.

3. The insulating apparatus for a metallic busbar according to claim 2, wherein the second insulated member is disposed around a periphery of the first insulated member.

4. The insulating apparatus for a metallic busbar according to claim 2, wherein the first insulated member and the second insulated member are hollow square-shaped housings.

5. The insulating apparatus for a metallic busbar according to claim 2, wherein the first insulated member has two opposite sides, and each side is formed with one of the slots, and the number of the securing members is at least two, the at least two securing members pass through two opposite sides of the second insulated member and the slots on two opposite sides of the first insulated member.

6. The insulating apparatus for a metallic busbar according to claim 1, wherein the at least one securing member has a rod, a first head and a second head, wherein the first head is connected to one end of the rod, the second head is connected to the other end of the rod, the rod passes through the second insulated member and the at least one slot of the first insulated member, wherein the rod is slidably disposed through the slot, the first head and the second head are disposed on two opposite sides of the first insulated member and the second insulated member respectively.

7. The insulating apparatus for a metallic busbar according to claim 1, wherein the first metallic strip is disposed in a power device, the power device has a back board, the first metallic strip passes through an opening of the back board, one end of the first insulated member has at least one retaining board, the at least one retaining board is protruded from an outer edge of the first insulated member, one end of the first insulated member is inserted into the opening of the back board, the at least one retaining board is abutted against an inner edge of the back board.

8. The insulating apparatus for a metallic busbar according to claim 1, wherein one end of the second insulated member has at least one protrusion board, the at least one protrusion board covers a periphery of the second metallic strip, a shield housing is disposed around the second metallic strip, the at least one protrusion board is disposed between the shield housing and the second metallic strip.

9. An insulating apparatus for a metallic busbar, disposed on an interconnection part of a first metallic strip and a second metallic strip of the metallic busbar, the insulating apparatus comprising:
   a first insulated member, formed with at least one slot, wherein one end of the first insulated member has at least one retaining board, and the at least one retaining board protrudes laterally from an outer edge of the first insulated member;
   a second insulated member, connected to the first insulated member in an overlapping manner; and
   at least one securing member, passing through the second insulated member and the at least one slot of the first insulated member to be slidably disposed in the at least one slot; wherein the first insulated member and the second insulated member are movable in a telescopic manner; thereby the first insulated member and the second insulated member are capable of covering the interconnection part of the first metallic strip and the second metallic strip of the metallic busbar.

* * * * *